Figure 1:
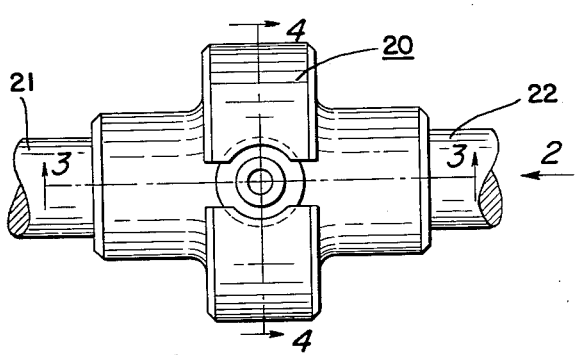

Sept. 19, 1961   M. P. BAKER ET AL   3,000,089
METHOD OF ASSEMBLING A TORQUE TRANSMITTING DEVICE
Original Filed Dec. 4, 1953   2 Sheets-Sheet 1

INVENTORS
Max P. Baker
BY Frederick W. Sampson
Attorney

Sept. 19, 1961     M. P. BAKER ET AL     3,000,089
METHOD OF ASSEMBLING A TORQUE TRANSMITTING DEVICE
Original Filed Dec. 4, 1953     2 Sheets-Sheet 2
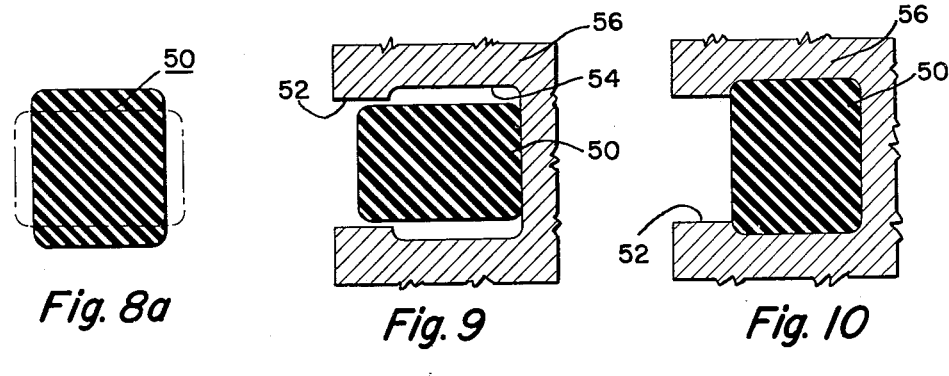
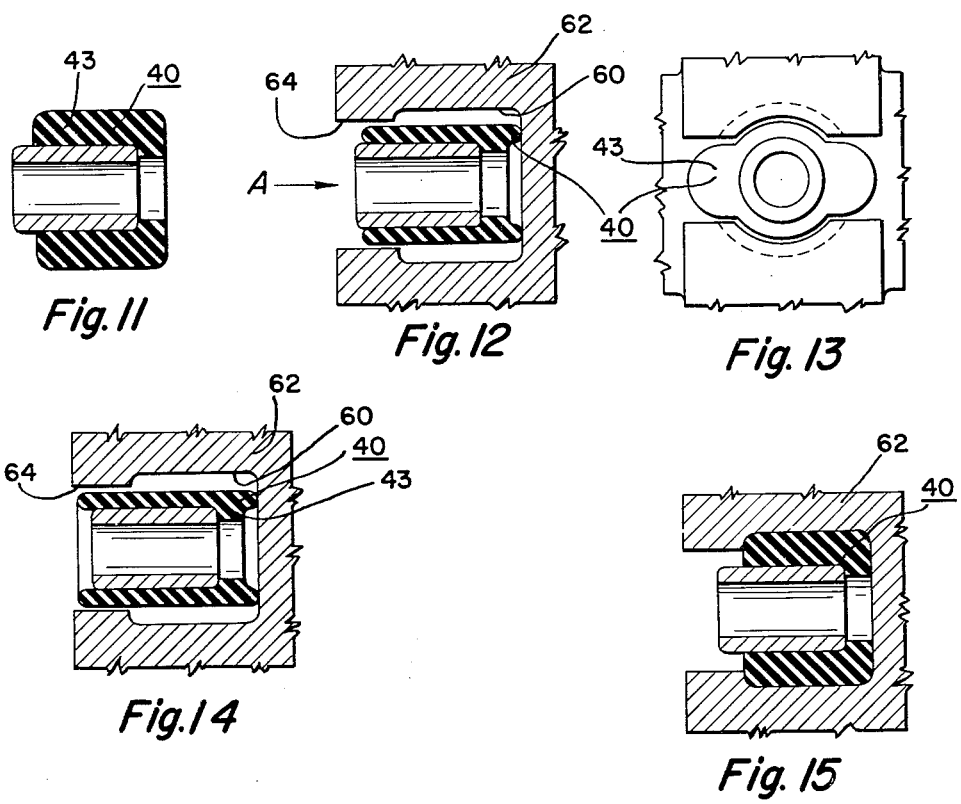
INVENTORS
Max P. Baker
BY Frederick W. Sampson
Attorney

# United States Patent Office 3,000,089
Patented Sept. 19, 1961

3,000,089
METHOD OF ASSEMBLING A TORQUE TRANSMITTING DEVICE
Max P. Baker and Frederick W. Sampson, Dayton, Ohio, assignors to General Motors Corporation, Detroit, Mich., a corporation of Delaware
Original application Dec. 4, 1953, Ser. No. 396,264, now Patent No. 2,800,777, dated July 30, 1957. Divided and this application Dec. 24, 1956, Ser. No. 637,344
5 Claims. (Cl. 29—436)

This invention relates to a method of assembling a torque transmitting device and, more particularly, to a method of assembling a universal joint that is adapted to transmit torque between a driving and driven member.

This is a divisional application of copending parent application Serial No. 396,264, filed December 4, 1953 now Patent Number 2,800,777.

It is an object of the present invention to provide a universal joint that will transmit rotation without vibration or shock between two rotatable shafts.

It is another object of the present invention to provide a method of assembling a universal joint to connect two shafts so that rotation but not vibration or shock, is transmitted therebetween.

It is a further object of the present invention to provide a method of assembling a universal joint that is adapted to transmit motion without shock or vibration between two rotatable shafts even if the shafts are angularly disposed in relation to each other. This object is materialized by providing circumferentially spaced chambers formed between two opposed faces of a pair of yokes when the yokes are in nested relation wherein reinforced elastomeric bushings are snugly interposed between the yokes for transmitting rotational movement therebetween and for simultaneously preventing any substantial relative longitudinal movement between the yokes.

In carrying out these objects, it is a further object of the invention to insert an elastomeric member into a chamber that is adapted to receive the member through a passage sized so that the elastomeric member will not normally pass therethrough. This object is materialized by deforming the elastomeric member and maintaining the elastomeric object in the deformed condition without the application of external force so that the deformed member may be passed through the passage and partially into the chamber, and then permitting the elastomeric member to resume its normal shape and draw itself through the passage and into the chamber.

It is another object of the present invention to assemble a universal joint by a method where reinforced elastomeric inserts or bushings are positioned within chambers formed by recesses in adjacent facing surfaces of spaced arms on two nested yokes, through restricted passages that lead therein from the exterior of the joint, said passages being smaller than the elastomeric portion and larger than the reinforced portion of said inserts by a step which includes spacing the yokes in nested relation, temporarily deforming the elastomeric portion of the inserts and maintaining the inserts in a deformed state without external pressure being applied thereto so that the elastomeric portion of the insert may be passed through the restricted openings and at least partially into the chamber whereby the inserts resiliently hold the yokes together when the insert resumes its normal shape.

In carrying out the above object, it is a further object to freeze the elastomeric portion of the insert in deformed position prior to assembly, whereby the bushing resumes its normal shape upon thawing.

Further objects and advantages of the present invention will be apparent from the following description, reference being had to the accompanying drawings wherein a preferred embodiment of the present invention is clearly shown.

Figure 2:
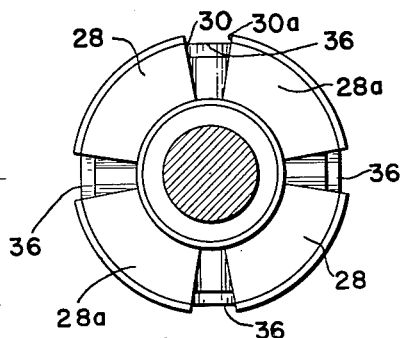
Figure 3:
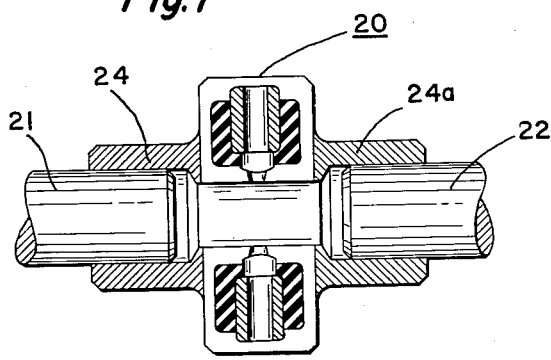
Figure 4:
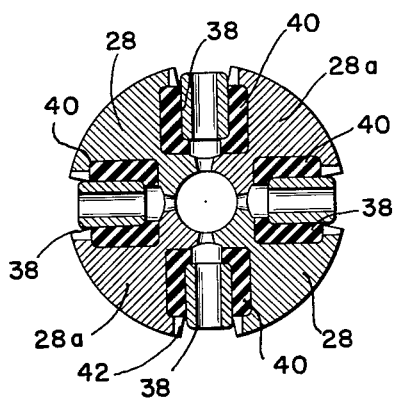
Figure 5:
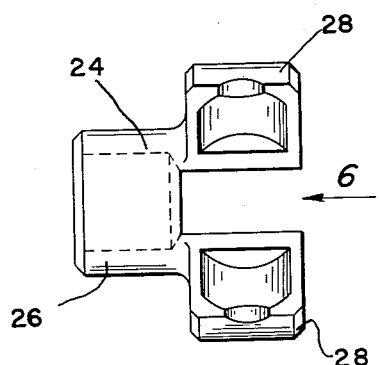
Figure 6:
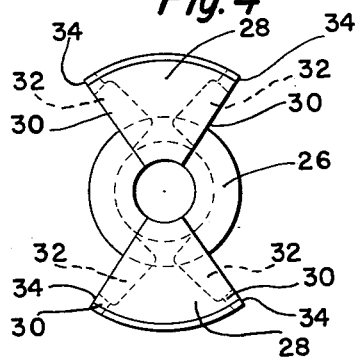
Figure 7:
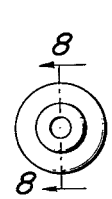
Figure 8:
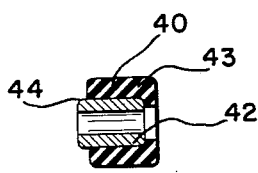

In the drawings:
FIGURE 1 is a view of the universal joint according to the present invention;
FIGURE 2 is an end view of the universal joint in FIGURE 1 taken in the direction of arrow 2;
FIGURE 3 is a cross-sectional view taken along the line 3—3 in FIGURE 1;
FIGURE 4 is a sectional view taken along line 4—4 in FIGURE 1;
FIGURE 5 is a side view of a yoke as used in the universal joint, as shown in FIGURE 1;
FIGURE 6 is a view in the direction of arrow 6 in FIGURE 5;
FIGURE 7 is an end view of the reinforcing bushing used in the universal joint in FIGURE 1;
FIGURE 8 is a sectional view taken along line 8—8 of FIGURE 7;
FIGURE 8a is a side view of an elastomeric insert that is adapted to be deformed into the shape shown in phantom;
FIGURE 9 is a view of the deformed insert in FIGURE 8 partially received in a chamber and passing through a restricted opening;
FIGURE 10 is a view of the insert in FIG. 8 as received in a chamber;
FIGURE 11 is a view of a reinforced insert;
FIGURE 12 is a view of the insert in FIGURE 11 deformed so that it may pass through a restricted opening and partially into a chamber;
FIGURE 13 is an end view of the deformed insert taken in the direction of arrow A in FIGURE 12;
FIGURE 14 shows another method of the deforming insert in FIGURE 11; and
FIGURE 15 is a view in section showing the insert in FIGURE 12 as received in a chamber through a restricted opening.

In the drawings the numeral 20 is used to designate a universal joint or flexible coupling that is adapted to connect and transmit rotational movement between two rotatable shafts 21 and 22. The universal joint 20 includes a pair of nested and mating yokes 24 and 24a, made of metal or other suitable material, that are secured to the respective shafts 21 and 22 so that they may rotate therewith.

One of the yokes 24, shown in FIGURES 5 and 6 of the drawings, has a body portion 26 and a pair of spaced arms or lugs 28 formed thereon. Each of the lugs has a pair of faces 30 wherein a recess 32 and a passage 34 which extends from the external portion of the lug 28 to the recesses 32 are formed.

As seen in FIGS. 2 and 4 of the drawings, the yokes 24 and 24a are positioned relative to each other so that the lugs 28 and 28a are in nested relation with each other. When in this position lugs 28 and 28a, because of their size, will have spaces 36 between adjacent faces 30 and 30a of the respective lugs. These spaces 36 will cooperate with recesses 32 and 32a to form chambers 38 wherein the elastomeric bushing or insert 40 to be hereinafter described, is positioned when it is inserted through the smaller channel or opening 42 as formed by passages 34 and 34a and spaces 36 on the respective lugs by a method to be hereinafter disclosed.

The insert 40 includes an elastomeric portion 43 and a metallic portion 44 which may be bonded, cemented or otherwise suitably secured to the elastomeric portion of the bushing in a manner well known to those skilled in the art. The metallic portion 44 of the bushing 40 acts as a reinforcement for the elastomeric portion 43 and limits excessive deformation of the elastomeric portion 43 when torque is being transmitted through the various component parts of the universal joint 20. The elastomeric portion of the bushing 43 is sized so that it may be snugly received in chamber 38 and is larger than opening 42. The metallic portion 44 of the bushing is sized so as to pass through the opening 42 into chamber 38.

The bushing 40 is inserted into the chambers 38 through opening 42 when the yokes are in nested relation. This is accomplished by deforming and maintaining in the deformed state the elastomeric portion 43 of the bushing so that the external diameter is reduced and so that the bushing may pass through the opening 42 and at least partially into chambers 38. This may be accomplished by first deforming by compression or tension the elastomeric portion of the bushing and then freezing the bushing as with the use of Dry Ice, while the bushing is in the deformed state so it maintains its deformed shape. When the bushing is in this condition, it may be inserted through the opening 42 into the chamber 48 so that it will at least partially extend therein. When the bushing thaws out, its inherent shape tends to be restored, and in so doing will draw itself completely into the chambers 38 through openings 42.

In FIGURES 8–10 the steps for inserting a solid elastomeric insert into a chamber, are shown. In this embodiment the insert 50, shown in section in FIG. 8, is suitably deformed into the shape shown in phantom so that the insert 50 may pass through passage 52 and partially extend into a chamber 54 in a structure 56 of any desired design. To accomplish the passage of insert 50 through passage 52, after the insert 50 has been deformed the temperature of the material is lowered until the material of the insert is frozen in the deformed shape. This lowering of temperature may be accomplished in various ways, for example, by subjecting the material thereof to the cooling effects of Dry Ice, etc. After the bushing has been inserted through passage 52 connecting with chamber 50, its temperature is permitted to rise, whereupon the elastomeric material of the insert will resume its normal free shape and in so doing will draw any portion thereof which has not been passed entirely through the passage 52 into the chamber 54 and thus be completely received therein, as shown in FIG. 10 of the drawings. It is to be noted that the passage 52 should be of sufficient length so that the insert, when in its distorted condition, will be received completely within the passage 52 and not extend to the exterior of the structure 56.

In FIGURES 11–13 a method whereby a reinforced bushing 40 as employed in the universal joint 20 may be inserted into the chambers 60 as formed in a supporting structure 62, through a passage 64, is diagrammatically illustrated. In this embodiment, the elastomeric portions 43 of bushing 40 is compressed as between two plates so that the bushing will assume the shape shown in FIGURES 12 and 13. This shape is maintained as previously indicated by lowering the temperature of the elastomeric material so as to prevent it from assuming its normal shape without the application of other external forces. When the bushing is in this condition, its shape will resemble that shown in FIGURE 13 whereby the bushing may be readily passed into chamber 60 through passage 64 after the temperature thereof rises and the elastomeric material tends to assume its normal shape.

In FIGURES 14 and 15 another method of deforming the elastomeric portion 43 of bushing 40 is shown. This is accomplished by axially stretching the elastomeric portions of the bushing so that the diameter thereof is decreased sufficiently so the bushing may pass through passage 64. In this condition, the temperature of the elastomeric material is lowered so that the material will not tend to resume its normal shape, so that the bushing 40 may be inserted into a chamber 60 in the support 62 through a passage 64, as above indicated.

From the above, it is manifest that the flexible coupling, torque transmitting device, or universal joint hereinbefore described is adapted to be used in many applications, for example, in conjunction with the steering mechanism of an automobile wherein it will transmit rotation between the parts of the steering mechanism without transmitting road shock or vibration to the wheel. The reinforced portion of the insert is important to the success of the present invention in that it will limit the deformation of the elastomeric material of the insert during the transmission of rotational forces between the arms of the yokes 24 and 24a.

The elastomeric portion may be of any suitable material that may be frozen in a deformed state and that will resume its normal free shape upon temperature rise. Further, the material should possess the proper amount of resiliency for the application involved and may be fabricated from any suitable elastomeric material such as natural or synthetic rubber, suitable organic plastic materials or any other material that will fulfill the requirements heretofore set forth.

Manifestly other shaped yokes may be utilized so that more than four chambers may be formed to provide other types of flexible couplings, or modifications thereof.

While the embodiment of the present invention as herein disclosed, constitutes a preferred form, it is to be understood that other forms might be adopted.

What is claimed is as follows:

1. In a method for inserting an elastomeric reinforced insert having an inner solid reinforcing member into a chamber through an opening smaller than the elastomeric portion and larger than the inner reinforcing member of said insert, the steps comprising; deforming the elastomeric portion of said insert against said inner reinforcing member so that it will pass through said opening, lowering the temperature of said insert as a unit so that the elastomeric portion thereof will remain in the deformed state without the application of external force, inserting said insert at least partially through said opening and into said chamber, and finally raising the temperature of said insert so that the elastomeric material thereof will resume its normal shape and draw itself through said opening into said chamber.

2. In a method of assembly of a universal joint having a pair of members nested in spaced relation with each other and having a surface spaced from a corresponding surface of the adjacent member, a recess in each of said surfaces forming a plurality of chambers between said members and on opening providing restricted access to said chambers from the periphery of said nested members, and a reinforced insert for each of said chambers; said insert having an outer elastomeric portion that is adapted to be received in a chamber and an external dimension greater than that provided by said opening and having a sleeve-like reinforcing portion that is dimensioned to pass through said opening and at least partially into said chamber when the insert is in said chamber, the steps comprising; deforming the elastomeric portion of said bushing against said reinforcing portion so its external dimension is reduced sufficiently so the insert may be inserted through said opening and partially into said chamber, reducing the temperature of said insert as a unit to maintain said insert in said deformed condition, inserting said deformed insert partially through said opening and partially into said chamber, and finally permitting said insert to resume its normal configuration and draw itself through said opening into said chamber for maintaining said spaced relation between said members.

3. In a method for inserting a bushing comprised of an elastomeric insert carried by a solid member through an opening smaller than said bushing into a chamber adapted to receive said bushing, the steps comprising; deforming said insert against said solid member into a shape sized for passing through said opening, cooling said insert and solid member as a unit so that the deformed shape of the insert is maintained without the application of external force, inserting said bushing with its deformed insert through said opening and at least partially into said chamber, and then permitting said insert to rise in temperature and resume its normal shape and draw itself into said chamber.

4. A method of resiliently separating inner and outer members by a quantity of elastomeric material interposed therebetween, the steps comprising; fitting a quantity of elastomeric material that has an external dimension greater than the dimension of the opening provided in said outer member to the outer surface of said inner member, deforming said elastomeric material against said inner member to reduce its outer diameter to a dimension that is less than the inner diameter of said outer member, reducing the temperature of said elastomeric material and said inner member as a unit sufficiently to maintain the elastomeric member in its deformed condition, inserting said inner member with its elastomeric material into said outer member, and then permitting said elastomeric material to increase its temperature and expand into tight engagement with said outer member.

5. The method as set forth in claim 4 wherein said quantity of elastomeric material is bonded to the outer surface of the inner member prior to deforming the elastomeric material.

References Cited in the file of this patent

UNITED STATES PATENTS

| | | |
|---|---|---|
| 1,679,992 | Short | Aug. 7, 1928 |
| 1,913,198 | Geyer | June 6, 1933 |
| 2,003,412 | Alden et al. | June 4, 1935 |
| 2,008,772 | Robertson | July 23, 1935 |
| 2,080,722 | Lee | May 18, 1937 |
| 2,153,466 | Hardy | Apr. 4, 1939 |
| 2,506,069 | Dalton | May 2, 1950 |